United States Patent
Liu et al.

(10) Patent No.: US 12,084,616 B1
(45) Date of Patent: Sep. 10, 2024

(54) STABILIZING SCAVENGER FORMULATIONS IN THE PRESENCE OF EXCESS FORMALDEHYDE FOR STORAGE AT ELEVATED TEMPERATURES

(71) Applicant: Baker Hughes Oilfield Operations LLC, Houston, TX (US)

(72) Inventors: Zhengwei Liu, Houston, TX (US); Scott Lehrer, Lakewood Ranch, FL (US); Jagrut Jani, Sugar Land, TX (US); Jerry J. Weers, Richmond, TX (US); Sunder Ramachandran, Sugar Land, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 18/201,155

(22) Filed: May 23, 2023

(51) Int. Cl.
C09K 8/532 (2006.01)

(52) U.S. Cl.
CPC .......... *C09K 8/532* (2013.01); *C09K 2208/20* (2013.01)

(58) Field of Classification Search
None
See application file for complete search history.

(56) References Cited

FOREIGN PATENT DOCUMENTS

WO   WO-2018001629 A1 * 1/2018

OTHER PUBLICATIONS

Steven, Yuhai Du, "Formaldehyde-MEA Triazine Based Hydrogen Sulfide Scavenger Behavior Study and Applications in the Oil and Gas Industry", (Unpublished master's thesis). University of Calgary, Calgary, AB. Accessible at https://prism.ucalgary.ca/handle/1880/112374., Aug. 3, 2020, 1-55.

* cited by examiner

*Primary Examiner* — Charles R Nold
(74) *Attorney, Agent, or Firm* — Crowe & Dunlevy, P.C.

(57) ABSTRACT

Shelf-stabilized $H_2S$ scavengers and methods for preparing such shelf-stabilized $H_2S$ scavengers. In one aspect, a stabilized hydrogen sulfide scavenger configured for storage at an elevated temperature includes a base scavenger, free formaldehyde, and a stabilizing alcohol. In another aspect, a method of preparing the stabilized hydrogen sulfide scavenger includes the steps of providing a quantity of base scavenger; providing a quantity of free formaldehyde; and adding a quantity of stabilizing alcohol, wherein the quantity of stabilizing alcohol is determined as a function of the provided quantity of free formaldehyde. In yet another aspect, the stabilized scavenger includes about 25 wt. % base scavenger, wherein the base scavenger is an amine-aldehyde condensate; about 15 wt. % free formaldehyde; and between about 10 wt. % and about 25 wt. % stabilizing alcohol.

16 Claims, 2 Drawing Sheets

STABILIZING SCAVENGER FORMULATIONS IN THE PRESENCE OF EXCESS FORMALDEHYDE FOR STORAGE AT ELEVATED TEMPERATURES

FIELD OF THE INVENTION

The present application is generally directed at shelf-stabilized $H_2S$ scavengers and methods for preparing such shelf-stabilized $H_2S$ scavengers.

BACKGROUND

Hydrogen sulfide ($H_2S$) is a highly flammable, colorless gas that occurs naturally in crude oil and other petroleum products. The presence of hydrogen sulfide in oil and gas equipment creates operational challenges related to corrosion, safety, and odor. It is desirable, therefore, to employ chemical $H_2S$ scavengers within these systems to mitigate these challenges.

Numerous $H_2S$ scavengers are commercially available to the oil and gas production and processing industries. These scavenger formulations include amine-aldehyde condensates such as hexahydrotriazines, aminocarbonols, diaminomethanes, and imines. Among the most popular scavengers are hexahydro-1,3,5-tris(hydroxyethyl)-s-triazine (more commonly known as MEA triazine) and hexahydro-1,3,5-trimethyl-s-triazine (more commonly referred to as MMA triazine). MEA triazine can be synthesized by the following reaction of monoethanolamine (MEA) and formaldehyde: 3 MEA ($C_2H_7NO$)+3 Formaldehyde ($CH_2O$) →MEA triazine ($C_9H_{21}N_3O_3$)+$3H_2O$.

The high cost of MEA triazine, MMA triazine, and similar scavengers has created market demand for low-cost $H_2S$ scavenger chemistries. Preparing a scavenger with excess formaldehyde is one strategy for lowering overall $H_2S$ treatment costs. For example, a formulation of MEA triazine may contain formaldehyde in excess of the amount required to react MEA to MEA triazine. The resulting presence of free formaldehyde in an MEA triazine formulation increases the scavenger's capacity to react with hydrogen sulfide without significantly increasing the cost of the product. However, the free formaldehyde can also increase the tendency of the formulation to degrade at high temperatures (e.g., 35° C. and above). Due to this thermal instability, existing scavengers with excess formaldehyde are generally not suitable for applications in warmer climates. There is, therefore, a need for a cost-effective $H_2S$ scavenger that exhibits improved shelf stability in warm conditions. The present disclosure is directed at these and other deficiencies in the prior art.

SUMMARY OF THE INVENTION

The inventive concepts disclosed are generally directed to the stabilization of hydrogen sulfide scavengers in the presence of excess formaldehyde for storage at elevated temperatures. In one embodiment, a stabilized hydrogen sulfide scavenger configured for storage at an elevated temperature is disclosed, in which the stabilized hydrogen sulfide scavenger includes a base scavenger, free formaldehyde, and a stabilizing alcohol.

In another aspect, a method of preparing the stabilized hydrogen sulfide scavenger includes the steps of providing a quantity of base scavenger; providing a quantity of free formaldehyde; and adding a quantity of stabilizing alcohol, wherein the quantity of stabilizing alcohol is determined as a function of the provided quantity of free formaldehyde.

In yet another aspect, the stabilized scavenger includes about 25 wt. % base scavenger, wherein the base scavenger is an amine-aldehyde condensate; about 15 wt. % free formaldehyde; and between about 10 wt. % and about 25 wt. % stabilizing alcohol.

DETAILED DESCRIPTION

Figure 1:
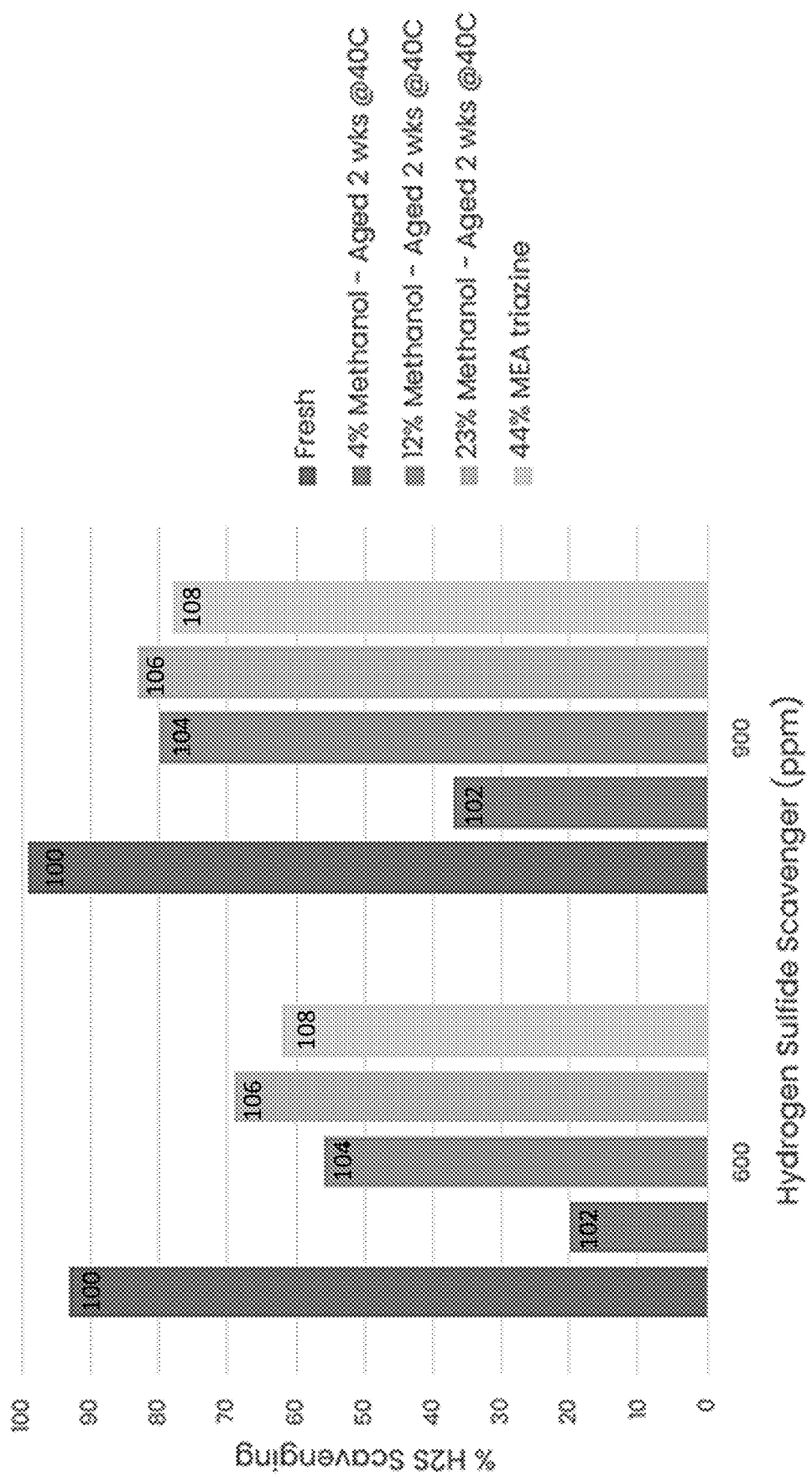
FIG. 1 provides a comparison of the elevated temperature shelf stability of stabilized scavenger formulations with a standard 44% MEA triazine scavenger.

It has been discovered that the shelf-stability of hydrogen sulfide scavenger formulations can be improved with the addition of stabilizing alcohols, particularly for hydrogen sulfide scavenger formulations that include formaldehyde and would otherwise degrade at elevated temperatures. According to various embodiments disclosed herein, a stabilized hydrogen sulfide scavenger includes a base scavenger, free formaldehyde, and a stabilizing alcohol.

In some embodiments, the base scavenger is an amine-aldehyde condensate. The base scavenger can be one or more hydrogen sulfide scavengers selected from the group of hexahydrotriazines, aminocarbonols, diaminomethanes, and imines. In some embodiments, the base scavenger is selected from the group consisting of MEA triazine, MMA triazine, and combinations of MEA triazine with MMA triazine.

The free formaldehyde can be excess formaldehyde following the synthesis of the base scavenger, or added formaldehyde, or a combination of both excess and added formaldehyde. As used herein, the term "excess formaldehyde" refers to the presence of formaldehyde in the hydrogen sulfide scavenger in excess of amounts used in the synthesis of the base scavenger, while the term "added formaldehyde" refers to formaldehyde that is introduced subsequent to the synthesis of the base scavenger. The term "free formaldehyde" refers to excess formaldehyde or to added formaldehyde.

The stabilizing alcohol can be a short chain alcohol. The term "short chain alcohols" refers to alcohols having between 1 and 12 carbon atoms (C1-C12 alcohols, where "C" designates the number of carbon atoms in the alcohol). In some embodiments, the stabilizing alcohol has one or more C1-C7 alcohols, which may be selected from the group consisting of methanol, ethanol, propanol, allyl alcohol, isopropanol, butanol, pentanol, isobutanol, and monoethylene glycol ("MEG"). It may be desirable to use a combination of these or other C1-C7 alcohols as the stabilizing alcohol based on available resources or cost considerations.

A combination of alcohols may also be desirable to obtain a particular flash point or volatility. In some embodiments where the stabilizing alcohol is a combination of one or more C1-C7 alcohols, the stabilizing alcohol may be at least 50 wt. % methanol. In other embodiments, the stabilizing alcohol may be approximately 38 wt. % methanol. In yet other embodiments, the stabilizing alcohol may be approximately 25 wt. % methanol.

In one embodiment, the stabilized hydrogen sulfide scavenger includes between about 10 wt. % and about 45 wt. % base scavenger, between about 10 wt. % and about 20 wt. % free formaldehyde, and between about 5 wt. % and about 30 wt. % stabilizing alcohol. In another embodiment, the stabilized hydrogen sulfide scavenger product includes between about 20 wt. % and about 30 wt. % base scavenger, between about 10 wt. % and about 20 wt. % free formaldehyde, and between about 10 wt. % and about 25 wt. % stabilizing alcohol. In one embodiment, the stabilized hydrogen sulfide scavenger includes between about 20 wt. % and about 30 wt. % base scavenger, between about 10 wt. % and about 20 wt. % free formaldehyde, and between about 10 wt. % and about 25 wt. % stabilizing alcohol. In yet another embodiment, the stabilized hydrogen sulfide scavenger product includes between about 24 wt. % base scavenger, about 15 wt. % free formaldehyde, and between about 10 wt. % and about 25 wt. % stabilizing alcohol. It will be understood that, as used herein, a range of X wt. % to Y wt. % will be interpreted to include the disclosure of each discrete integer value between X and Y (e.g., X, X+1, X+2 . . . . Y−1, Y).

In one more specific embodiment, the stabilized hydrogen sulfide scavenger product includes between about 24 wt. % MEA triazine, about 15 wt. % free formaldehyde, and about 12 wt. % methanol. In another more specific embodiment, the stabilized hydrogen sulfide scavenger product includes between about 24 wt. % MEA triazine, about 15 wt. % free formaldehyde, and about 23 wt. % methanol.

Within the stabilized hydrogen sulfide scavenger, the stabilizing alcohol can be added in quantities or concentrations derived as a function of the quantity or concentration of free formaldehyde. In some embodiments, the stabilizing alcohol is added such that the ratio of the quantity of stabilizing alcohol to the quantity free formaldehyde is within a range from 1:3 to 5:1 (stabilizing alcohol:formaldehyde). In exemplary embodiments, the ratio of formaldehyde to stabilizing alcohol is within a range from 1:2 to 4:1. As used herein, ranges of concentration ratios should be interpreted to include any and all ratios within the prescribed ranges. For example, embodiments where the ratio of stabilizing alcohol to formaldehyde is expressed within the range of 1:3 to 5:1 should be interpreted to also include the discrete intermediate concentrations ratios of 1:2, 1:1, 2:1, 3:1, and 4:1 (stabilizing alcohol:formaldehyde), and fractional ratios therebetween (e.g., 1:1.5 and 3.5:1).

In some embodiments, the stabilized hydrogen sulfide scavenger may be prepared by adding the stabilizing alcohol to the base scavenger and free formaldehyde before being transported to a storage facility. In other embodiments, the stabilizing alcohol is transported separately from the base scavenger and free formaldehyde before being combined to prepare the stabilized hydrogen sulfide scavenger.

For embodiments in which the free formaldehyde derives entirely or partially from added formaldehyde, the added formaldehyde can be pre-mixed with the stabilizing alcohol and then added to the base scavenger. The added formaldehyde can be added to the stabilizing alcohol at the manufacturing facility before shipment, or after initial shipment but before combination with the base scavenger.

In some embodiments, the base scavenger may be transported to the storage facility as a concentrate, then blended with water at the storage facility. In such cases, the addition of the added formaldehyde may occur at the storage facility at the same time as the introduction and/or blending of water with the base scavenger. Alternatively, the base scavenger may be prepared prior to transport in mixture with a low initial quantity or concentration of excess formaldehyde, with a greater quantity or concentration of added formaldehyde added once the base scavenger arrives at the storage facility.

Thus, as described above, the stabilized hydrogen sulfide scavenger can be formulated by adding the stabilizing alcohol to the base scavenger in quantities or concentrations based on the amount or concentration of excess formaldehyde present with the base scavenger. In other embodiments, the stabilized hydrogen sulfide scavenger is formulated by adding the stabilizing alcohol and added formaldehyde to the base scavenger. In each case, the stabilizing alcohol can be added, with or without added formaldehyde, to the base scavenger during manufacture or post-shipment depending on the anticipated storage and shipment times and temperatures. The various embodiments of the stabilized hydrogen sulfide scavenger disclosed above exhibit excellent shelf stability for extended periods (more than two weeks) at elevated temperatures.

Example I

Tests were performed to demonstrate the stabilizing properties of methanol on a scavenger formulation of MEA triazine with excess formaldehyde. A scavenger formulation of 24 wt. % MEA triazine and 15 wt. % excess formaldehyde was initially obtained. Samples with 4 wt. %, 12 wt. %, and 23 wt. % methanol were prepared from this scavenger formulation and were aged for two (2) weeks at 40° C. As a practical note, when a 37 wt. % formaldehyde source is used for the synthesis of 24 wt. % MEA triazine and 15 wt. % excess formaldehyde, it is only possible to obtain an $H_2S$ scavenger with up to 12 wt. % methanol due to the water carried with the 37 wt. % formaldehyde. This practical limitation may constrain manufacturing processes that preference the use of 37 wt. % formaldehyde. Nevertheless, as demonstrated by the preparation of a 23 wt. % sample, 12 wt. % is not a technical limitation regarding the amount of methanol.

For this set of tests, a standard ASTM D5705 protocol was modified as follows to determine the percentage of $H_2S$ scavenging for the different $H_2S$ scavengers:

Hydrocarbon Sample.

The standard ASTM D5705 protocol measures $H_2S$ in the headspace above a field hydrocarbon sample. Rather than using a field sample, the hydrocarbon sample for this test ("sour Isopar") was artificially created by sparging 5,000 ppm hydrogen sulfide through a quantity of isoparaffinic solvent Isopar™ M.

Test Bottle Preparation.

The standard ASTM D5705 protocol does not involve the addition of an $H_2S$ scavenger. For these tests, $H_2S$ scavengers were each added to the test bottles before the addition of sour Isopar. The test bottles were mixed, then agitated continuously for two hours at 49° C. prior to the headspace measurement.

FIG. 1 illustrates the performance (percentage of $H_2S$ scavenging) observed after treatment of the sour Isopar test bottles with the following $H_2S$ scavengers: a fresh formulation of 24 wt. % MEA triazine and 15 wt. % excess formaldehyde (100), the aged sample with 4 wt. % methanol (102), the aged sample with 12 wt. % methanol (104), the aged sample with 23 wt. % methanol (106), and a sample of 44 wt. % MEA triazine with no free formaldehyde (108). This fifth sample (108) was not aged, as MEA triazine without free formaldehyde is known to be stable under field storage conditions for extended time periods. For a first set of tests, 600 ppm of the $H_2S$ scavengers (100, 102, 104, 106, 108) was added to separate sour Isopar test bottles. For a second set of tests, 900 ppm of each $H_2S$ scavenger (100, 102, 104, 106, 108) was added instead.

Compared to the fresh formulation of 24 wt. % MEA triazine and 15 wt. % excess formaldehyde (100), the aged sample with 4 wt. % methanol (102) experienced significantly reduced performance after its storage at an elevated temperature. $H_2S$ scavengers with higher methanol content demonstrated reduced performance loss compared to the aged formulation with 4 wt. % methanol (102). For example, the aged formulation with 12 wt. % methanol (104) had similar performance to the 44 wt. % MEA triazine with no free formaldehyde (108), but at a lower cost. As shown by aged sample (106), further increasing to 23 wt. % methanol provided some additional benefit, demonstrating a trend for the increase of methanol content and performance of the $H_2S$ scavenger.

Example II

Additional tests were performed to compare the performance of the following stabilizing alcohols: pure methanol, a combination of isopropanol with a minority proportion of methanol, and a combination of monoethylene glycol ("MEG") with the same proportion of methanol. As in Example I, a scavenger formulation of 24 wt. % MEA triazine and 15 wt. % excess formaldehyde was initially obtained. Samples with 4 wt. % and 13 wt. % methanol were prepared from this scavenger formulation. Another sample was prepared with a stabilizing alcohol of 8 wt. % isopropanol and 5 wt. % methanol. Yet another sample was prepared with 8 wt. % MEG and 5 wt. % methanol. Each of these samples were aged for two weeks at 40° C.

Figure 2:
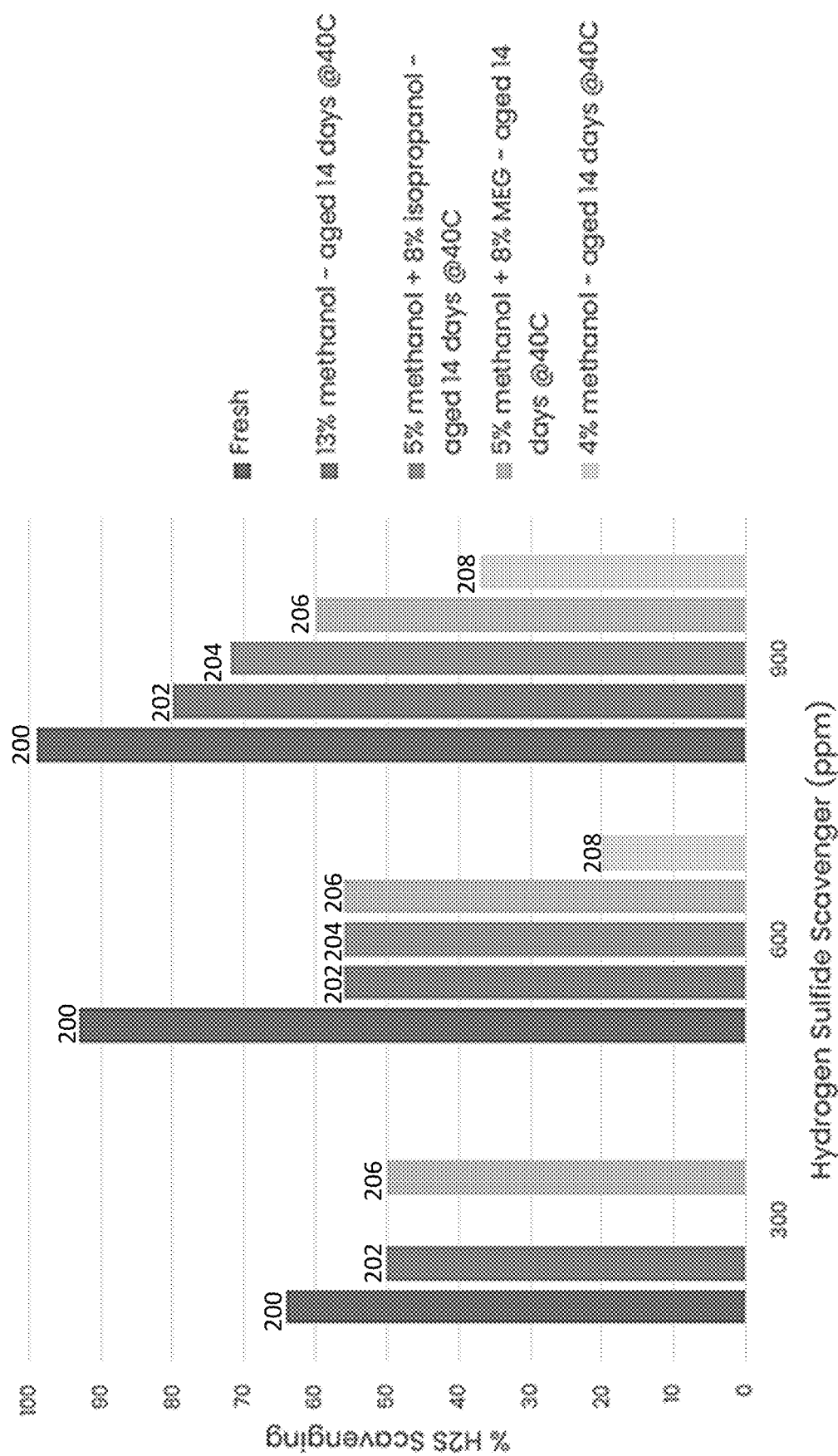
FIG. 2 illustrates the stabilizing properties of various stabilizing alcohols on a hydrogen sulfide scavenger stored at elevated temperatures.

The same modified ASTM D5705 protocol of Example I was used to evaluate performance for the different $H_2S$ scavengers. The results are depicted in the graph of FIG. 2. Tests were performed with 600 ppm and 900 ppm of the following $H_2S$ scavengers: a fresh formulation of 24 wt. % MEA triazine and 15 wt. % excess formaldehyde (200), the aged sample with 13 wt. % methanol (202), the aged sample with 8 wt. % isopropanol and 5 wt. % methanol (204), the aged sample with 8 wt. % MEG and 5 wt. % methanol (206), and the aged sample with 4 wt. % methanol (208). An additional test was performed with 300 ppm of the fresh formulation (200), the aged sample with 13 wt. % methanol (202), and the aged sample with 8 wt. % MEG and 5 wt. % methanol (206).

The aged sample with 13 wt. % methanol (202) demonstrated similar percentages of $H_2S$ scavenging performance to the aged sample (204) where a majority of methanol was substituted with isopropanol (i.e., 8 wt. % isopropanol and 5 wt. % methanol). Any apparent differences are likely within test reproducibility. Substituting a majority of methanol with MEG instead of isopropanol (i.e., aged sample (206) with 8 wt. % MEG and 5 wt. % methanol) slightly decreased stability. Nevertheless, both of these aged samples (204, 206) performed better than the aged sample with only 4 wt. % methanol (208).

In the foregoing specification, the invention has been described with reference to specific embodiments thereof. However, it will be evident that various modifications and changes can be made thereto without departing from the broader scope of the invention as set forth in the appended claims. Accordingly, the specification is to be regarded in an illustrative rather than a restrictive sense. For example, different base scavengers and stabilizing alcohols, treatment procedures, proportions, dosages, temperatures, and amounts not specifically identified or described in this disclosure or not evaluated in a particular Example are still expected to be within the scope of this invention. Moreover, although the stabilized scavengers disclosed herein are intended for use as hydrogen sulfide scavengers, it will be appreciated that the same stabilized scavengers may also provide a scavenging function for other petroleum-based products.

The present invention may suitably comprise, consist of, or consist essentially of the elements disclosed and may be practiced in the absence of an element not disclosed. As used herein, the singular forms "a," "an," and "the" are intended to include the plural forms as well, unless the context clearly indicates otherwise. As used herein, the term "about" in reference to a given parameter is inclusive of the stated value and has the meaning dictated by the context (e.g., it includes the degree of error associated with measurement of the given parameter, i.e., ±5% of the stated value). As used herein, the term "and/or" includes any and all combinations of one or more of the associated listed items. As used herein, the term "elevated temperatures" refers to a temperature range above about 35° C.

It is claimed:

1. A stabilized hydrogen sulfide scavenger configured for storage at an elevated temperature, wherein the stabilized hydrogen sulfide scavenger comprises:
   a base scavenger;
   free formaldehyde; and
   a stabilizing alcohol.

2. The stabilized hydrogen sulfide scavenger of claim 1, wherein the base scavenger is an amine-aldehyde condensate.

3. The stabilized hydrogen sulfide scavenger of claim 2, wherein the base scavenger is selected from the group consisting of hexahydrotriazines, aminocarbonols, diaminomethanes and imines.

4. The stabilized hydrogen sulfide scavenger of claim 3, wherein the base scavenger is selected from the group consisting of MEA triazine, MMA triazine, and combinations of MEA triazine with MMA triazine.

5. The stabilized hydrogen sulfide scavenger of claim 4, wherein the free formaldehyde comprises excess formaldehyde.

6. The stabilized hydrogen sulfide scavenger of claim 4, wherein the free formaldehyde comprises added formaldehyde.

7. The stabilized hydrogen sulfide scavenger of claim 1, wherein the stabilizing alcohol is selected from the group consisting of C1-C7 alcohols and combinations thereof.

8. The stabilized hydrogen sulfide scavenger of claim 7, wherein the stabilizing alcohol is selected from the group consisting of methanol, ethanol, propanol, allyl alcohol, isopropanol, butanol, pentanol, isobutanol, monoethylene glycol ("MEG"), and combinations thereof.

9. The stabilized hydrogen sulfide scavenger of claim 7, wherein the stabilizing alcohol is a combination of C1-C7 alcohols comprising at least 50 wt. % methanol.

10. The stabilized hydrogen sulfide scavenger of claim 1 comprising:
    between about 20 wt. % and about 30 wt. % base scavenger;
    between about 10 wt. % and about 20 wt. % free formaldehyde; and
    between about 10 wt. % and about 25 wt./% stabilizing alcohol.

11. The stabilized hydrogen sulfide scavenger of claim 1 comprising:
    about 24 wt. % base scavenger;
    about 15 wt. % free formaldehyde; and
    about 12 wt. % stabilizing alcohol.

12. The stabilized hydrogen sulfide scavenger of claim 1 comprising:
   about 24 wt. % base scavenger;
   about 15 wt. % free formaldehyde; and
   about 23 wt. % stabilizing alcohol.

13. The stabilized hydrogen sulfide scavenger of claim 1, wherein a concentration ratio of the stabilizing alcohol to free formaldehyde is within a range from 1:3 to 5:1 (stabilizing alcohol:formaldehyde).

14. The stabilized hydrogen sulfide scavenger of claim 13, wherein the concentration ratio of stabilizing alcohol to free formaldehyde is within a range from 1:2 to 4:1 (stabilizing alcohol:formaldehyde).

15. A stabilized scavenger comprising:
   about 25 wt. % base scavenger, wherein the base scavenger is an amine-aldehyde condensate;
   about 15 wt. % free formaldehyde; and
   between about 10 wt. % and about 25 wt. % stabilizing alcohol.

16. The stabilized scavenger of claim 15, further comprising:
   about 25 wt. % base scavenger, wherein the base scavenger is MEA triazine;
   about 15 wt. % excess formaldehyde; and
   between about 10 wt. % and about 25 wt. % stabilizing alcohol, wherein the stabilizing alcohol comprises about 50% methanol.

* * * * *